United States Patent [19]

Nagara et al.

[11] 4,107,493
[45] Aug. 15, 1978

[54] RADIATOR CAP

[75] Inventors: Toshio Nagara, Toyota; Kogoro Nakagawa, Kariya; Nobumasa Higo, Toyota; Masanori Kuno, Nagoya; Hiroshi Arai; Jun Ota, both of Toyota, all of Japan

[73] Assignee: Nippondenso Co., Ltd., Kariya, Japan

[21] Appl. No.: 557,379

[22] Filed: Mar. 11, 1975

[30] Foreign Application Priority Data

Mar. 14, 1974 [JP] Japan .................................. 48-29666

[51] Int. Cl.² .......................................... H01H 35/18
[52] U.S. Cl. .................................. 200/84 C; 73/308; 137/558; 340/624
[58] Field of Search ...................... 137/558; 123/41.15; 340/59, 60, 244 A; 73/308, 313, 306, 322; 220/322, 306, 309, 203; 200/84 R, 84 C; 335/205

[56] References Cited

U.S. PATENT DOCUMENTS

| | | | |
|---|---|---|---|
| 2,164,450 | 7/1939 | Eshbaugh et al. | 220/203 |
| 2,236,360 | 3/1941 | Beam | 200/84 C |
| 3,046,369 | 7/1962 | Hicks | 200/153 W |
| 3,051,805 | 8/1962 | Binford | 335/205 |
| 3,164,696 | 1/1965 | Pusch | 335/205 |
| 3,216,256 | 11/1965 | Barnes | 73/322 |
| 3,368,405 | 2/1968 | Christian | 123/41.15 |
| 3,370,467 | 2/1968 | Healy | 123/41.15 |
| 3,370,468 | 2/1968 | Healy | 123/41.15 |
| 3,622,976 | 11/1971 | Howard | 340/60 |
| 3,751,614 | 8/1973 | Jones | 200/84 C |

Primary Examiner—David Smith, Jr.
Attorney, Agent, or Firm—Cushman, Darby & Cushman

[57] ABSTRACT

A radiator cap composed of a cap body, a compression gasket assembly connected to the cap body and adapted to open and close in accordance with the pressure of the coolant in the radiator, a float engaged with the cap body so as to move up and down in accordance with the level of the coolant. The upper edge of the float is formed so that upon contact with a gasket assembly, a valve is formed with said gasket assembly. A reed switch secured to the cap body is opened or closed in response to movement of the float so that the reed switch actuates suitable warning means when the level of coolant falls over a predetermined line.

6 Claims, 8 Drawing Figures

RADIATOR CAP

BACKGROUND OF THE INVENTION

This invention relates to an improved radiator cap for sealing the radiator of internal combustion engines and monitoring the liquid level in such radiators and warning when that liquid level is too low.

Previous attempts to monitor liquid levels involved using the tank cap on the reserve tank. Such reserve tank caps were equipped with a permanent magnet and reed switch with the reed switch adapted to detect the level of coolant in the reserve tank and thereby in the radiator through the position of the permanent magnet. The reserve tank functions to keep the pressure in the radiator at a predetermined value by feeding coolant into the radiator or by receiving an excess from the radiator through the radiator cap through the free expansion and contraction of the coolant. Therefore, to detect the decrease of coolant in the reserve tank is to detect the decrease of coolant in the radiator. However, the reed switch associated with the reserve tank cap cannot detect the decrease of the coolant when it is caused from various breakdowns of cooling systems, such as corrosion which could cause apertures within the radiator or coolant circuit. The interior or radiators would, under such a condition, be at an atmospheric pressure because of the aperture which would hold the vacuum-operated valve closed, thereby preventing the coolant from flowing back into the radiator and preventing accurate monitoring by the reserve tank system.

SUMMARY OF THE INVENTION

The object of the present invention is to provide an improved radiator cap which can directly detect the decrease of coolant in the radiator, even if holes developed in the radiator through corrosion so that the coolant could leak out. The other object of the present invention is to provide a radiator cap with a coolant-level detecting means which does not require any conventional or special vacuum-operated valve and is thus more simply constructed. Still another object of the present invention is to provide a radiator cap which can be repaired with ease because it is attached to the upper tank of the radiator through an ordinary filler neck. A still further object of the present invention is to provide a radiator cap which can be easily attached to used cars because it readily fits on any radiator.

These and other objects will become apparent from the following detailed description of preferred embodiments.

DETAILED DESCRIPTION OF THE PREFERRED EMBODIMENT

Figure 1:
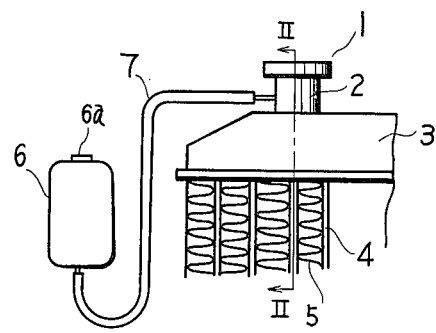
FIG. 1 shows a partial schematic view of the radiator having a radiator cap of the present invention, a reserve tank and the connections therebetween.

Referring first to FIG. 1, a radiator cap 1 of the present invention is engaged with a filler neck 2 fixed on an upper tank 3 of the radiator. Many flat tubes 4 are soldered to the tank 3 with corrugated fins 5 which are also soldered between the tubes 4. A hose connector 7 connects the filler neck 2 with a reserve tank 6 which has a reserve tank cap 6a on its head. The cap 6a has an opening on its head to connect the interior of the reserve tank 6 to the atmosphere.

Figure 2:
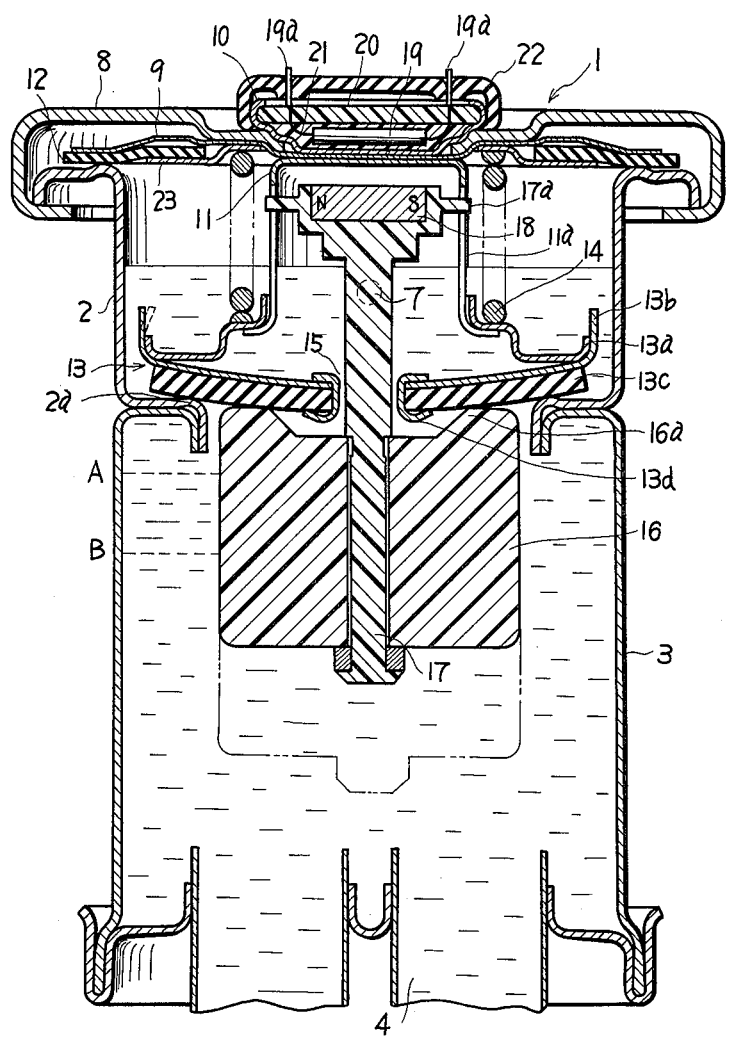
FIG. 2 shows a cross-sectional view of the first embodiment of the present invention, which is taken on line II- II of FIG. 1.

Next, referring to FIG. 2, a cap body 8 is made of nonmagnetic metal, such as stainless steel and is directly engaged with the filler neck 2. A spring plate 9, fixing member 10 and reverse-cup-shaped support member 11 are all made of nonmagnetic material, such as brass and welded to each other by a spot welding. The cap body 8 is fixed between the spring plate 9 and fixing member 10. A first gasket 12 is supported between the spring plate 9 and a support plate 23 to seal the upper opening of the filler neck 2. A compression gasket assembly 13 contacts a lower valve seat 2a of the filler neck 2 and comprises a retainer 13a inserted in the support member 11, a dish-like support member 13b fixed to the retainer 13a and a second gasket 13c fixed to the support member 13b by a fixing member 13d. A compression spring 14 exerts pressure on retainer 13a so as to push gasket 13c against valve seat 2a formed at the lower part of the neck 2. A through hole 15 is formed in a central portion of the support member 13b and gasket 13c. A float 16 of any suitable material which will float in water is positioned below the gasket assembly 13 and fixed, for example, by hot calking, to a lower end of a shaft 17 which, for example, may be made from a synthetic resin. The float 16 is designed with an upper edge 16a which will close the hole 15 when it is forced into contact with the lower surface of the gasket 13c when the coolant is above a certain level such as level A. Thus, when the coolant expands to raise the pressure in the radiator, the raising coolant level forces upper edge 16a against gasket 13c closing hole 15 so that the compression gasket assembly 13 opens and allows the coolant to flow between gasket 13c and valve seat 2a back to the reserve tank 6 through hose 7. In this situation, float 16 and gasket assembly 13 function as a compression valve.

On the other hand, when the level falls below level A, float 16 moves downwardly separating the upper edge 16a from the lower surface of gasket 13c, thereby opening the through hole 15 to allow coolant in the reserve tank 6 to flow to the radiator. In this situation, a float 16 and gasket assembly 13 function as a vacuum-operated (negative pressure) valve but float 16 does not excessively move down. Thus when negative pressure is produced in the radiator, the coolant in the reserve tank 6 flows through hose 7 into the radiator cap 1 through hole 15 and then into the radiator between upper edge 16a and gasket 13c.

A permanent magnet 18 is fixed on the upper end of the shaft 17 and will move up and down in accordance with the movement of the shaft 17 as caused by the movement of float 16. Guide projections 17a are inserted in guide slits 11a formed in the support member 11, thereby restricting twisting of the shaft 17. A reed switch 19 is soldered to an electrical printed-board 20 which is secured to the fixing member 10 for example by calking or other suitable bonding agents. The reed switch 19 is fixed between the board 20 and fixing member 10 by a filler 21 and has lead wires 19a. The printed-board 20 is covered by a rubber cap 22.

An electrical circuit connected to the reed switch 19 is explained below, referring to FIG. 3. When the reed switch 19 is closed, a transistor 25 becomes nonconductive, thereby deenergizing warning means 24 which, for example could be a light, buzzer or any other suitable warning device suitably located within the vehicle. However, when the switch 19 is opened, the transistor 25 becomes conductive and allows current from a battery 29 to flow through a resistor 26, warning means 24 and transistor 25 thereby energizing the warning means 24.

The operation of the above embodiment is as follows. When the coolant in the radiator is above the level A, the pressure exerted on float 16 lifts float 16 up thereby establishing a tight contact between the upper edge 16a and gasket 13c, thereby closing the connection between the upper and lower side of the gasket assembly 13 and through hole 15. When float 16 is in this position, shaft 17 has been moved upwardly and the permanent magnet 18 rests at its highest position thereby closing the reed switch 19.

Figure 3:
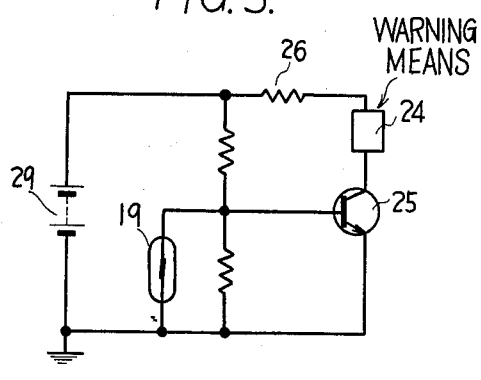
FIG. 3 shows an electrical circuit connected to the radiator cap of the present invention.

When using the circuit shown in FIG. 3, no warning occurs since reed switch 19 is closed and transistor 25 is deenergized. After the engine starts, the temperature of the coolant rises thus expanding the volume thereof and the pressure within the radiator. As pressure rises, the compression gasket assembly 13 is lifted to an open condition, thereby allowing a part of the coolant to flow from the radiator to the reserve tank 6 through the connecting hose 7. When the temperature of the coolant is reduced, the volume of the coolant contracts and thus the level falls. When the level falls below level A, float 16 moves downwardly separating the upper edge 16a from the lower surface of gasket 13c, thereby opening the through hole 15 to allow coolant in the reserve tank 6 to flow to the radiator. Since in this situation, float 16 is functioning as part of a vacuum-operated valve, float 16 does not excessively move down. Accordingly, reed switch 19 is held in a closed condition. However, if the radiator or cooling circuit had an aperture or hole at some place, for example, in the radiator, the coolant would leak out. When the level of the coolant falls below level B, float 16 would have moved downwardly a sufficient distance so as to weaken the magnetic force applied to maintain reed switch 19 in a closed condition. Consequently, reed switch 19 opens thereby energizing warning means 24 signaling the driver of the coolant level problem.

Figure 4:
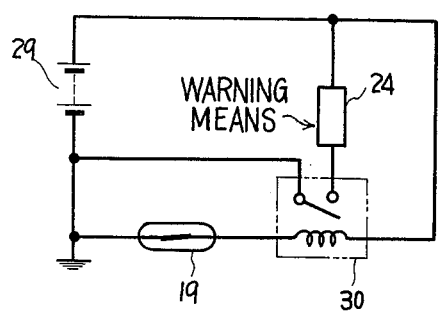
FIG. 4 shows another electrical circuit connected to the radiator cap of the present invention.

The electrical circuit shown in FIG. 4 can be used as a substitute for the circuit shown in FIG. 3, i.e. a relay 30 is provided for the energization of the warning means 24a.

Figure 5:
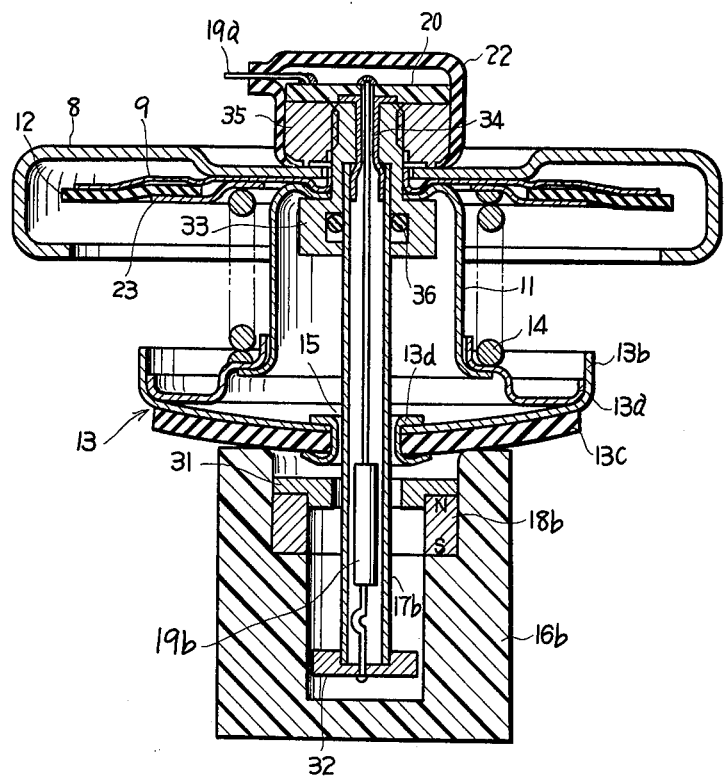
FIG. 5 shows a cross-sectional view of a second embodiment of the present invention.

Referring to FIG. 5, a tubular shaft 17b is provided in substitution for the substantial shaft 17 shown in FIG. 2 and supports a reed switch 19b therein at a position lower than gasket 13c. The tubular shaft 17b is supported by a retaining member 33, guide tube 34 and seal ring 36, and has a stopper 32 at the bottom end thereof. A circular permanent magnet 18b is fixed in a float 16b with a fixing ring 31. One end of the reed switch 19b is soldered to a printed-board 20 to be connected to a lead wire 19a and the other end is grounded through the stopper 32, tubular shaft 17b, retaining member 33, nut 35 and cap body 8. The basic operation of this embodiment is substantially the same as shown in FIG. 2, although in this embodiment the float 16b and magnet 18b move independently of tubular shaft 17b. The reed switch 19b is energized in accordance with the movement of the magnet 18b as explained above with regard to FIG. 2, thereby energizing the warning means 24 when float 16b moves downwardly such that magnet 18b falls below level B.

Figure 6:
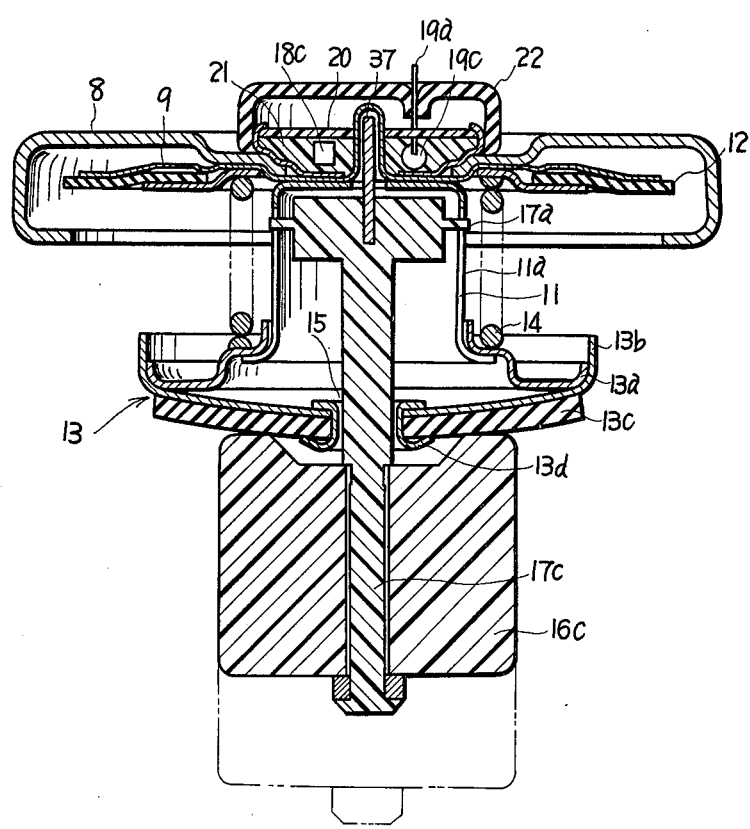
FIG. 6 shows a cross-sectional view of a third embodiment of the present invention.
Figure 7:
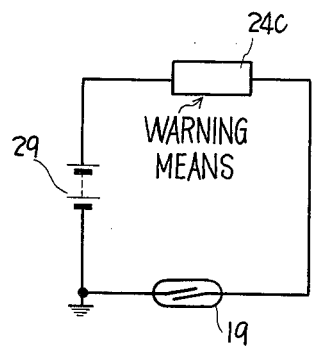
FIG. 7 shows the other electrical circuit connected to the radiator cap of the present invention.

In the embodiment shown in FIG. 6, a reed switch 19c is closed when the level of the coolant goes down. crossing the level B. Therefore, the switch 19c holds the open condition when the level of the coolant is in normal position above the level B. A reed switch 19c is positioned at an upper part of the radiator cap and is located opposite a permanent magnet 18c. A shielding plate 37 is fixed on an upper end of a shaft 17c and is positioned between switch 19c and magnet 18c upon normal condition of the coolant. Therefore, under normal operating conditions, the magnetism of the magnet 18c is absorbed in the shielding plate 37 so that reed switch 19c remains open. Switch 19c closes when the float 16c moves down a distance sufficient to move plate 37 out from its position between switch 19c and magnetic 18c. According to this embodiment an electrical circuit shown in FIG. 7 is available wherein warning means 24c is connected in series with reed switch 19c and battery 29. Thus, when switch 19c is closed warning means 24c is energized.

Figure 8:
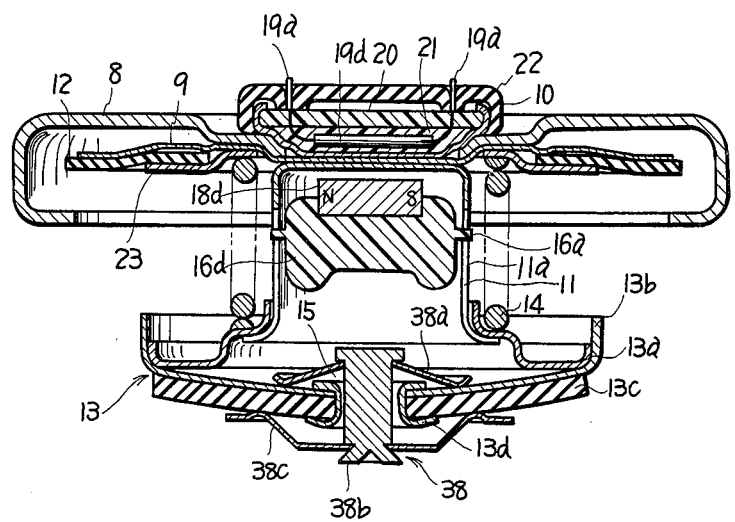
FIG. 8 shows a cross-sectional view of a fourth embodiment of the present invention.

Referring to FIG. 8, a float 16d is positioned in the reversed-cup-shaped support member 11 and magnet 18d is attached to the upper end thereof. A vacuum-operated valve 38 is formed by a spring plate 38a, valve plate 38c and supporting rod 38b like a conventional radiator cap. The reed switch 19d opens on an excessive downward movement of the float 16d in accordance with the level of the coolant in the filler neck 2.

While the embodiments of FIGS. 2, 5 and 6 have been explained in detail with regard to a cooling system employing a reserve tank, they can be adopted in a cooling system having no reserve tank.

While the present invention has been explained in terms of certain preferred embodiments, it is to be understood that various modifications may be made within the scope of the following claims without departing from the spirit of the invention.

What is claimed is:

1. A radiator cap for sealing a valve seat located within the filling neck of a radiator and for monitoring coolant levels within the radiator and signaling when the coolant level within the radiator falls below a predetermined level comprising:
   a cap body,
   a gasket assembly connected to said cap body,
   means fixed to said cap body for generating a signal indicating that the coolant has fallen below the predetermined level, and
   float means for sensing the level of coolant within said radiator and actuating said generating means, said float means being constructed to move up and down in accordance with changes in the level of the coolant,
   wherein said gasket assembly comprises a support member having a gasket fixed thereto, said support member and said gasket having an opening extending therethrough, said float means comprising a movable shaft located within said opening, said shaft having a top end a bottom end, a float member attached to said bottom end, a magnet attached to said top end, said generating means comprising a reed switch located so as to be opposite said magnet said cap further comprising a reversed-cup-shaped support member secured to said cap body and having guide slits, said magnet having projections adapted to slidably engage said slits so that twisting of said magnet is restricted during movement thereof.

2. A radiator cap as claimed in claim 1 wherein said float member is provided with an upper edge constructed to cooperate with said gasket to form a valve therewith.

3. For use with a radiator of the type having an upper tank and fitted thereon a filler neck with a lower valve seat, a radiator cap for monitoring coolant levels within a radiator and signaling when the coolant level within the radiator falls below a predetermined level comprising;
 a cap body;
 a positive pressure valve fitted to said cap body and having an annular seal for seating on said lower valve seat of said filler neck of said radiator;
 generating means fixed to said cap body for generating a signal indicating that the coolant has fallen below the predetermined level;
 float means for said upper tank of said radiator and for seating and unseating with the undersurface of said annular seal so that they together respectively form a compression and negative pressure valve, said float means being constructed to move up and down in accordance with changes in the level of the coolant; and
 actuating means fixed to said float means for being moved up and down in accordance with the movement of said float means and for actuating said generating means to generate said signal when the coolant falls below the predetermined level,
 wherein said positive pressure valve further includes:
 a support member coupled to said annular seal and constructed to extend across said lower valve seat; and
 a spring for urging said support member and said annular seal downwardly,
 said support member and said annular seal being provided with a centrally located opening extending therethrough;
 said generating means including,
 a tubular shaft connected at its upper end to said cap body, the lower end extending through said opening, and
 a reed switch disposed in said tubular shaft; and wherein
 said actuating means comprising a permanent magnet fixed to said float means for actuating said reed switch to close and open its contacts in accordance with the level of the coolant within said radiator.

4. For use with a radiator of the type having an upper tank and fitted thereto a filler neck with a lower valve seat, a radiator cap for monitoring coolant levels within a radiator and signalling when the coolant level within the radiator falls below a predetermined level comprising;
 a cap body;
 a positive pressure valve fitted to said cap body and having an annular seal for seating on said lower valve seat of said filler neck of said radiator;
 generating means fixed to said cap body for generating a signal indicating that the coolant has fallen below the predetermined level;
 float means for said upper tank of said radiator and for seating and unseating with the undersurface of said annular seal so that they together respectively form a compression and negative pressure valve, said float means being constructed to move up and down in accordance with changes in the level of the coolant;
 actuating means fixed to said float means for being moved up and down in accordance with the movement of said float means and for actuating said generating means to generate said signal when the coolant falls below the predetermined level,
 a permanent magnet fixed to said cap body and located in an opposed relationship to said generating means,
 a gasket assembly connected to said cap body and comprising a support member having a gasket fixed thereto, said support means and said gasket having an opening extending therethrough, wherein said float means comprises a float member and a movable shaft located within said openings, said shaft having a top end and a bottom end, said float member being attached to said bottom end and a shielding plate attached to said top end so as to move with said float member so that said shielding plate is positioned between said magnet and said generating means during normal operating conditions when the coolant is above said predetermined level thereby absorbing the effects of said magnet to prevent actuation of said generating means, said shielding plate being positioned below said magnet and the generating means when the coolant level is below said predetermined level thereby allowing said magnet to actuate said generating means,
 wherein said generating means comprises a reed switch.

5. For use with a radiator of the type having an upper tank and fitted thereon a filler neck with a lower valve seat, a radiator cap for monitoring coolant levels within a radiator and signaling when the coolant level within the radiator falls below a predetermined level comprising:
 a cap body;
 a positive pressure valve fitted to said cap body and having an annular seal for seating on said lower valve seat of said filler neck of said radiator;
 generating means fixed to said cap body for generating a signal indicating that the coolant has fallen below the predetermined level;
 float means for said upper tank of said radiator and for seating and unseating with the undersurface of said annular seal so that together they respectively form a compression and a negative pressure valve, said float means being constructed to move up and down in accordance with changes in the level of the coolant;
 actuating means fixed to said float means for being moved up and down in accordance with the movement of said float means and for actuating said generating means to generate said signal when the coolant falls below the predetermined level;

a gasket assembly connected to said cap body and comprising a support member having a gasket attached thereto said support member and said gasket having an opening extending therethrough;

a hollow shaft attached to said cap and extending through said opening, said float means comprising a float member movably secured around a lower portion of said shaft so as to be vertically movable therealong, said float member having an upper edge, a magnet attached to said float member adjacent said upper edge, said generating means including means responsive to magnetic force from said magnet and being located within said hollow shaft so that movement of said float member downwardly along said shaft below said predetermined level actuates said generating means.

6. A radiator cap as claimed in claim 5 wherein said signal generating means comprises a reed switch, and said actuating member comprises a magnet.

* * * * *